Patented Aug. 19, 1947

2,426,014

UNITED STATES PATENT OFFICE 2,426,014

PREPARATION OF ACYL CYANIDES

William F. Gresham, Wilmington, Del., assignor to E. I. du Pont de Nemours & Company, Wilmington, Del., a corporation of Delaware No Drawing. Application February 3, 1944, Serial No. 520,963

10 Claims. (Cl. 260—464)

This invention relates to acyl cyanides, and particularly to an improved process for manufacturing acyl cyanides from readily available starting materials.

Hitherto acyl cyanides, such as acetyl cyanide, propionyl cyanide, and butyryl cyanide, were prepared by dehydrating alpha-aldehyde ketoximes, or by heating acid chlorides with metal cyanides, especially silver cyanide. A dimer of acetyl cyanide has been prepared by treating acetic anhydride with potassium cyanide and hydrochloric acid in ether solution at 0° C. ("Richter's Organic Chemistry," Alliott, 3d ed., vol. 1, page 464, P. Blakiston's Son and Co., 1934). Economically none of these methods was satisfactory for use in commercial manufacture of acetyl cyanide in large quantity.

The object of the present invention is to provide a process whereby acyl cyanides can be manufactured from readily available materials. Another object is to provide an economical process for manufacturing acyl cyanides without simultaneous formation of excessive quantities of diacyl cyanides.

These and other objects are accomplished in accordance with this invention by reaction between hydrogen cyanide and a carboxylic acid anhydride (i. e., a compound of the formula (acyl)$_2$O), preferably in the vapor phase in the presence of contact materials. In a specific embodiment of this invention, an acyl cyanide is prepared by passing an acid anhydride with hydrogen cyanide over a contact catalyst at elevated temperatures to produce a reaction product from which acyl cyanide may be recovered by distillation. The reaction which takes place may be written as follows:

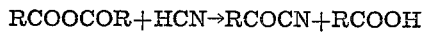

RCOOCOR+HCN→RCOCN+RCOOH

In the above formulae, R is an alkyl or an aryl group.

The acid anhydrides which may be processed with hydrogen cyanide in accordance with this invention include the aliphatic and aromatic acid anhydrides, such as acetic anhydride, benzoic anhydride, propionic anhydride, isobutyric anhydride, adipic anhydride, glutaric anhydride, sebacic anhydride, and the like. The reaction between the acid anhydrides and hydrogen cyanide proceeds satisfactorily at atmospheric pressure.

The contact catalysts which may be used according to this invention include charcoal, silica gel, boron phosphate, alumina, pelleted Super Filtrol, titania gel, alumina gel, aluminum phosphate and the like. Many of these catalysts are of the type which have the capacity of absorbing relatively large volumes of gases. Of these absorbtive contact catalysts, the preferred members are of the group consisting of silica gel, activated charcoal and activated alumina. The temperature for the catalytic vapor phase reaction between the acid anhydrides and hydrogen cyanide, according to this invention, should be in the range of 150° to 500° C., preferably about 200° to 450° C. Temperatures higher than 450° C. are not generally employed, since excessive thermal decomposition of the products occurs at such temperatures.

It is generally desirable to employ an excess of hydrogen cyanide, best results being obtained when the molal ratio of hydrogen cyanide to acid anhydride initially is between 2:1 and 10:1. The optimum space velocity, based on total acid anhydride and hydrogen cyanide charged is about 200 to 800, when the molal ratio of hydrogen cyanide to acetic anhydride is between 3:1 and 5:1. The term space velocity means the number of cubic centimeters of gas, measured at normal temperature and pressure, which passes over one cubic centimeter of catalyst per hour.

In the practice of this invention the acid anhydride and hydrogen cyanide are generally vaporized and thereafter passed through a tubular converter containing the catalyst at the desired temperature. After leaving the reaction zone, the reaction products are cooled and subsequently distilled. The invention is further illustrated by means of the following examples, without being limited thereto.

*Example 1.*—A mixture containing 153 grams (1.5 mole) of acetic anhydride and 120 grams (4.45 moles) of hydrogen cyanide is passed over 100 cc. of an activated charcoal catalyst, 8 to 14 mesh, at atmospheric pressure, at a temperature of 240° to 271° C. (time required=5.5 hours). The reaction product, after leaving the reaction zone, is cooled by means of a water-cooled condenser, and the resulting condensate is distilled. The first cut (103 grams) is recovered hydrogen cyanide; cut #2, B. P. 60° to 70° C. at 250 mm., is acetyl cyanide (28.4 grams); cut #3 is acetic acid (30 grams); cut #4 is acetic anhydride, 99.8 grams. There remains in the distillation vessel 3.2 grams of distillation residue.

When this experiment is repeated without the contact catalyst, but with the reaction zone packed with broken quartz, the reaction takes place to a very much less extent, and 90% of the hydrogen cyanide charged is recovered unchanged.

*Example 2.*—A mixture containing 158 grams (1 mole) of isobutyric anhydride and 108 grams (4 moles) of hydrogen cyanide is passed over 100 cc. of an activated alumina catalyst, 8 to 14 mesh, at atmospheric pressure and at a temperature of 250° to 280° C. (time required=4.0 hours). Distillation of the reaction product gives isobutyryl cyanide, B. P. 117–120° C., in 25 to 30% yield, based on the anhydride charged.

*Example 3.*—A mixture containing 102 grams (1.0 mole) of acetic anhydride and 40.5 grams (1.5 moles) of hydrogen cyanide was passed over 80 cc. of silica gel catalyst at 353° to 366° C. (time required=4.0 hours). Fractional distillation of the reaction product gave: 33.5 grams hydrogen cyanide, B. P. 25° to 27° C.; 12 grams of acetyl cyanide, B. P. 93° C.; 26 grams of acetic acid B. P. 114° to 120° C.; 62.5 grams of recovered acetic anhydride, B. P. 54° C. at 20 mm.; and 2 grams of acetoxymethylmalonitrile (acetyl cyanide dimer); B. P. 53° C. at 3 mm.

The synthesis of acyl cyanides in accordance with this invention may be conducted either batchwise or continuously. Any suitable apparatus may be used, such as a tubular converter in the continuous process or a closed form of reactor in a process operated batchwise. Superatmospheric pressures are not essential, but they may be employed. The yield of acyl cyanide is determined in part by the nature of the contact material, but a very large number of porous contact materials are found to be effective. The invention is therefore not limited to the particular catalysts set forth herein but may be performed with absorptive contact materials in general.

The acyl cyanides which may be prepared in accordance with this invention are useful in the manufacture of a wide variety of organic chemicals, including aminoalcohols, propylene glycol and derivatives thereof.

It will be understood that many apparently different embodiments of this invention may be made without departing from the spirit and scope thereof.

I claim:

1. Process for manufacture of acyl cyanides, containing from 2 to 10 carbon atoms per molecule, which comprises reacting hydrogen cyanide with a carboxylic acid anhydride in the vapor phase in the presence of a solid contact absorptive catalyst, and separating the said acyl cyanide from the reaction product.

2. Process for the manufacture of acyl cyanides containing from 2 to 10 carbon atoms per molecule which comprises reacting a carboxylic acid anhydride with hydrogen cyanide at a temperature in the range of 150° C. to 500° C. in the presence of a solid contact absorptive catalyst.

3. Process for the manufacture of acyl cyanides containing from 2 to 10 carbon atoms per molecule which comprises passing a carboxylic acid anhydride with hydrogen cyanide through a reaction zone at a temperature in the range of 200° to 450° C. in the presence of a solid contact absorptive catalyst and separating the said acyl cyanide from the resulting reaction product.

4. A process set forth in claim 2, wherein the said acid anhydride is acetic anhydride, and the said acyl cyanide is acetyl cyanide.

5. The process set forth in claim 2, wherein the said acid anhydride is isobutyric anhydride, and the said acyl cyanide is isobutyryl cyanide.

6. In a process for the manufacture of acyl cyanides containing from 2 to 10 carbon atoms per molecule the steps which comprise reacting a carboxylic acid anhydride with hydrogen cyanide in the presence of a solid absorptive contact catalyst whereby a monomeric acyl cyanide is produced, and separating the said acyl cyanide from the resulting reaction product.

7. In a process for manufacture of acyl cyanides containing from 2 to 10 carbon atoms per molecule the steps which comprise reacting a carboxylic acid anhydride with hydrogen cyanide at a temperature within the range of 150° to 500° C. in the presence of an absorptive contact catalyst of the group consisting of silica gel, activated charcoal, and Activated Alumina, and separating acyl cyanide from the resulting reaction product.

8. In a process for manufacture of acetyl cyanide the steps which comprise reacting acetic anhydride with hydrogen cyanide at a temperature in the range of 150° to 500° C. in the presence of activated charcoal, and separating acetyl cyanide from the resulting reaction product.

9. A process for manufacturing acyl cyanides containing from 2 to 10 carbon atoms per molecule which comprises passing a mixture of hyrogen cyanide and a carboxylic acid anhydride, in which mixture the molal ratio of hydrogen cyanide to acid anhydride is between 2:1 and 10:1, through a reaction zone at a temperature in the range of 150° to 500° C. in the presence of a solid contact absorptive catalyst, whereby a monomeric acyl cyanide is produced, and separating the said acyl cyanide from the resulting reaction product.

10. A process for manufacturing acetyl cyanide which comprises passing a mixture of hyrogen cyanide and acetic anhydride, in which mixture the molal ratio of hydrogen cyanide to acetic anhydride is between 3:1 and 5:1, at a space velocity in the range of 200 to 800, over an absorptive contact catalyst of the group consisting of silica gel, activated charcoal and Activated Alumina at a temperature in the range of 200° to 450° C., cooling the resulting product, and separating acetyl cyanide therefrom by distillation.

WILLIAM F. GRESHAM.

REFERENCES CITED

The following references are of record in the file of this patent:

UNITED STATES PATENTS

| Number | Name | Date |
| --- | --- | --- |
| 2,108,829 | Sixt et al. | Feb. 22, 1938 |

OTHER REFERENCES

Plattner, Monatsh fur Chemie, vol. 36, pp. 899–910 (1915).

Staudinger, "Die Ketene," (1912) p. 36.

Wilsmore et al., Jour. Chem. Soc. (London), vol. 97, p. 1968 (1910).